Sept. 23, 1958 W. S. WOLFRAM 2,852,952
ADJUSTABLE GRIP PULLEY
Filed June 10, 1955

INVENTOR.
William S. Wolfram
BY
E. W. Christen
ATTORNEY

United States Patent Office 2,852,952
Patented Sept. 23, 1958

---

2,852,952

ADJUSTABLE GRIP PULLEY

William S. Wolfram, Birmingham, Mich., assignor to General Motors Corporation, Detroit, Mich., a corporation of Delaware Application June 10, 1955, Serial No. 514,444

2 Claims. (Cl. 74—230.24)

This invention relates to power transmitting apparatus and more particularly to that type of apparatus in which torque is transmitted through frictionally engaged surfaces.

It is well known that the torque which may be transmitted through frictional surfaces is dependent upon the force of engagement between the surfaces. In order to realize efficient performance of such apparatus it is desirable to regulate the force of engagement in accordance with varying conditions of operation. In certain apparatus, such as belt drives, clutches, and analogous devices, improved performance is obtained by regulating the force of engagement in accordance with both rotative speed and transmitted torque. In a belt drive, for example, regulation of the force of engagement in accordance with torque is desirable to accommodate changes in load and regulation in accordance with speed is desirable to compensate for belt elongation effects which result from centrifugal force.

It is recognized that numerous means have been devised in the prior art for accomplishing regulation of frictional engagement in accordance with variations in speed and transmitted torque. However, these devices are subject to numerous disadvantages such as the requirement of a multiple or unduly complex parts. Further, it is a characteristic of the prior art devices that separate means are required for sensing torque and speed conditions and for regulation of the force of engagement between the frictional surfaces.

It is therefore an object of this invention to provide an improved power transmitting mechanism which automatically regulates the force of engagement between frictional surfaces in response to both torque and speed conditions.

It is a further object of this invention to provide a mechanism for exerting an engaging force which varies in accordance with changes in both rotative speed and transmitted torque.

A further object is to provide improved means for regulating frictional engagement in accordance with variations in transmitted torque.

It is an additional object to provide regulating means for a frictional drive to account for torque and speed variations.

In the accomplishment of these objects there is provided rotatable driving and driven members connected by frictionally engaged surfaces. Coupling means, movable in response to both speed variations and torque variations, are interposed between the members to regulate the force of engagement between the surfaces.

A more complete understanding of the invention may be had from the detailed description which follows taken with the accompanying drawings in which.

Figure 1:
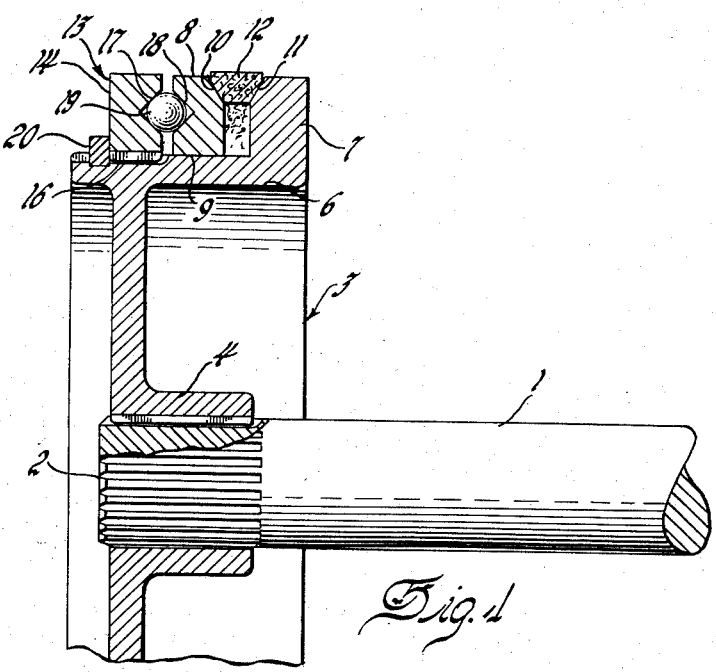
Figure 1 is a fragmentary view in cross section of the inventive device.
Figure 2:
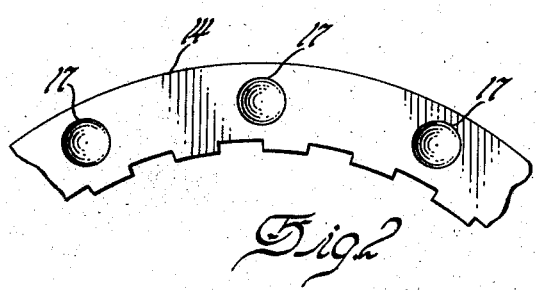
Figure 2 illustrates a detail of construction.
Figure 3:
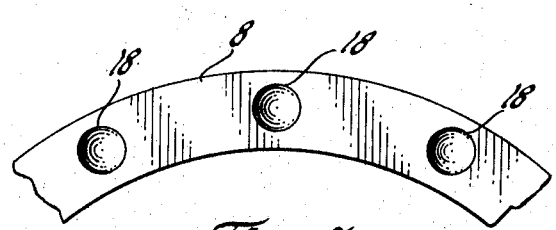
Figure 3 illustrates another detail of construction.

Referring now to the drawings, there is shown an illustrative embodiment of the invention in a belt drive arrangement for the transmission of power. Obviously, the illustrated apparatus is of general utility for interconnecting a suitable power source and utilization apparatus not shown.

A rotatable shaft 1 terminates in a splined portion 2 upon which is mounted a pulley, designated generally at 3, for rotation with the shaft 1. The pulley 3, having a splined hub 4 coacting with the spline portion 2, is provided with an axially extending flange portion or cylindrical rim 6 which terminates in a radially extending flange or fixed sheave-part 7. The rim 6 is provided with a radial bearing surface 9 supporting a movable sheave-part 8 which is capable of rotative and axial displacement with respect to the rim 6. The sheave-parts 7 and 8 constitute a pulley sheave and are provided with complementary chamfered sheave surfaces 10 and 11, respectively, which define a pulley groove adapted to receive in frictional engagement a drive belt 12, suitably of the V-belt type.

To provide for regulation of the frictional engagement between the belt 12 and the pulley sheave-parts 8 and 11, a coupling mechanism, designated generally at 13, is provided. The coupling mechanism comprises a reaction member 14 which is non-rotatably mounted on rim 6 by any suitable means such as the spline connection 16. The reaction member 14 and movable sheave-part 8 are spaced apart axially and define plural pairs of complementary, oppositely disposed recesses 17 and 18, respectively. The recesses 17 and 18 are preferably of conical or cup-like configuration and provide a surface inclined in both the radial direction and the circumferential direction. A coupling or wedge element 19, preferably a spherical ball, is disposed in each pair of complementary recesses 17 and 18 for the transmission of rotative effort between reaction member 14 and sheave-part 8. It is noted that ball 19 and the recesses 17 and 18 are so proportioned dimensionally that the ball engages the recess walls at portions which are inclined in both the radial and the circumferential directions.

It will be assumed in the explanation of operation which follows that the shaft 1 is a driving member and that the belt 12 is a driven member or that power is transmitted from the shaft to the belt. Rotative effort or torque is transmitted from the shaft 1 through the pulley 3 to the reaction member 14 and the fixed sheave-part 7. This rotative effort is coupled from the reaction member 14 through the ball 19 to the movable sheave-part 8. Since the driven belt 12 is in frictional engagement with both sheave-parts and resists rotation thereof, relative angular displacement will occur between the movable sheave-part 8 and reaction member 14. The amount of angular displacement will depend upon the amount of torque transmitted through the coupling 13. This displacement will cause the ball 17 to ride up the inclined surfaces of recesses 17 and 18 in a circumferential direction causing axial movement of the movable sheave-part 8 toward the fixed sheave-part 7. The movement of sheave-part 8 increases the effective diameter of the sheave and increases the force of engagement between the sheave surfaces and belt surfaces. In this manner, the coupling responds to changes in transmitted torque to vary the force of engagement between the frictional surfaces.

Rotation of the pulley 3 exerts on coupling element 19 a centrifugal force which increases with rotative speed. As a result of the centrifugal force, the coupling element 19 moves outwardly against the inclined surfaces of the recesses 17 and 18. This movement, by wedging action, displaces the movable sheave-part 8 toward the fixed sheave-part 7 and increases the effective diameter of the sheave. In this manner the force of engagement between the frictional surfaces of belt 12 and sheave-parts 7 and 8 is regulated in accordance with rotative speed.

It will be appreciated that the pulley 3 and associated coupling mechanism 13 operate in the same manner for either direction of rotation thus lending the additional advantage that the device may be employed in reversible drives. It will also be apparent that the pulley 3 or the belt 12, either one, may be the driving member and the other may be the driven member. The operation and the advantages will be the same as for the example of operation given above.

This invention has been described with respect to a particular embodiment for illustrative purposes only and such description is not to be construed in a limiting sense upon the scope of the invention. Many modifications and variations within the spirit and scope of the invention will now occur to those skilled in the art. For a definition of the invention, reference is made to the appended claims.

I claim:

1. A belt drive mechanism adapted for a frictional driving belt of the type subject to elongation due to centrifugal force and comprising a rotatable shaft and pulley mounted on the shaft for rotation therewith, said pulley including a two-part sheave adapted to receive the driving belt, one part of said sheave being movable axially and rotatively with respect to the other part to vary the effective diameter of the sheave, a reaction member non-rotatably mounted on the pulley in spaced relation to the movable part of the sheave, said movable part and said reaction member defining plural pairs of oppositely disposed conical recesses, and a drive transmitting ball seated in each pair of said recesses coupling the movable part and reaction member together and being movable axially and tangentially in the recesses for imparting axial movement to said movable part to vary the effective sheave diameter to compensate for said belt elongation produced by variations in speed and to vary the frictional engagement of the sheave and belt in response to torque variations.

2. A belt drive mechanism adapted for a frictional driving belt of the type subject to elongation due to centrifugal force comprising a rotatable shaft and a pulley mounted on the shaft for rotation therewith, said pulley including a rim portion terminating in a relatively fixed sheave-part, a relatively movable sheave-part supported on the rim portion and being capable of axial and rotative movement thereon, said sheave-parts defining a V-shaped groove adapted to receive a V-belt, a reaction member axially spaced from the movable sheave-part and non-rotatably mounted on the rim portion, said reaction member and said movable sheave-part defining plural pairs of oppositely disposed conical recesses, a ball seated in each pair of said recesses for transmitting rotative effort between said reaction member and said movable sheave-part, said ball being movable radially and tangentially in said recesses for imparting axial movement to said movable sheave-part to vary the effective diameter of said groove to compensate for said belt elongation produced by variations in speed and to regulate the frictional engagement of the sheave and belt in response to changes in torque transmitted by said pulley.

References Cited in the file of this patent

UNITED STATES PATENTS

| 1,683,715 | Erban | Sept. 11, 1928 |
| 2,496,201 | Dodge | Jan. 31, 1950 |

FOREIGN PATENTS

| 258,667 | Switzerland | May 16, 1949 |
| 645,904 | Great Britain | Nov. 8, 1950 |